United States Patent
Huang et al.

(10) Patent No.: US 11,368,174 B2
(45) Date of Patent: Jun. 21, 2022

(54) SCALABLE DUAL-POLARIZATION MM-WAVE MULTI-BAND 5G PHASED ARRAY WITH A MULTI-MULTIPLIERS LO GENERATOR

(71) Applicant: SWIFTLINK TECHNOLOGIES CO., LTD., Suzhou (CN)

(72) Inventors: Min-Yu Huang, Richmond (CA); Thomas Chen, Richmond (CA)

(73) Assignee: SWIFTLINK TECHNOLOGIES CO., LTD., Suzhou (CN)

( * ) Notice: Subject to any disclaimer, the term of this patent is extended or adjusted under 35 U.S.C. 154(b) by 39 days.

(21) Appl. No.: 17/007,427

(22) Filed: Aug. 31, 2020

(65) Prior Publication Data

US 2022/0069851 A1    Mar. 3, 2022

(51) Int. Cl.
*H04B 1/00*    (2006.01)
*H04B 1/38*    (2015.01)

(52) U.S. Cl.
CPC ......... *H04B 1/0092* (2013.01); *H04B 1/0064* (2013.01); *H04B 1/38* (2013.01)

(58) Field of Classification Search
CPC .. H04B 1/0082; H04B 1/0092; H04B 1/0064; H04B 1/38; H03L 7/104; H03L 7/193; H03L 7/1976
See application file for complete search history.

(56) References Cited

U.S. PATENT DOCUMENTS

| | | | |
|---|---|---|---|
| 9,160,396 B2 * | 10/2015 | Soltanian | H04B 1/0082 |
| 10,411,745 B1 | 9/2019 | Huang et al. | |
| 2006/0084469 A1 * | 4/2006 | Malone | H04B 1/0082 |
| | | | 455/552.1 |
| 2007/0021080 A1 * | 1/2007 | Kuriyama | H04B 1/0057 |
| | | | 455/272 |
| 2007/0082644 A1 * | 4/2007 | Ho | H04B 1/0082 |
| | | | 725/68 |
| 2008/0132192 A1 * | 6/2008 | Lim | H04B 1/0064 |
| | | | 455/315 |
| 2012/0120992 A1 * | 5/2012 | Soltanian | H04B 1/0082 |
| | | | 375/221 |
| 2013/0165058 A1 * | 6/2013 | Mostafa | H04B 1/0458 |
| | | | 455/337 |
| 2016/0112072 A1 * | 4/2016 | Bauder | H04B 7/0602 |
| | | | 370/297 |
| 2020/0186175 A1 | 6/2020 | Ben-Yishay | |

* cited by examiner

*Primary Examiner* — Khanh C Tran
(74) *Attorney, Agent, or Firm* — Womble Bond Dickinson (US) LLP

(57) ABSTRACT

According to one embodiment, an RF frontend IC device includes a first RF transceiver to transmit and receive RF signals within a first frequency band and a second RF transceiver to transmit and receive RF signals within a second frequency band that is different than the first frequency band. The RF frontend IC device further includes a converter and a multi-band local oscillator (LO) generator to provide LO signals to the converter. The multi-band LO generator includes a phase-lock loop (PLL) circuit operating at a PLL operating frequency, wherein the PLL operating frequency is outside of the first frequency band and the second frequency band. The multi-band LO generator also includes multiple frequency multipliers coupled to the PLL circuit to upscale the PLL operating frequency and to generate an LO signal having a frequency within a predetermined proximity from the frequency band.

20 Claims, 10 Drawing Sheets

SCALABLE DUAL-POLARIZATION MM-WAVE MULTI-BAND 5G PHASED ARRAY WITH A MULTI-MULTIPLIERS LO GENERATOR

FIELD OF THE INVENTION

Embodiments of the present invention relate generally to wireless communication devices. More particularly, embodiments of the invention relate to a millimeter-wave (mm-wave) multi-band communication system.

BACKGROUND

As wireless communications technologies evolve, multi-mode or multi-band wireless systems are routinely available. Such systems may partition different functions into different integrated circuit (IC) devices. For example, a wireless system may include a baseband processor, a transceiver, control circuitry, receive circuitry, transmit circuitry, or the like. Such multiple IC devices are sometimes inconvenient and cost ineffective.

Next-generation (post-5G) wireless networks promise 50× more speed, 10× less latency, and 1000× more capacity than 4G/LTE, while requiring low-latency response and high capacity access nodes for future broadband mobile fiber-wireless links. For example, the 3GPP specifies 5G new radio (NR) systems in frequency range two (FR2) to operate at least in n257, n258, and n260 bands. Some of the band subsets are assigned differently in various countries or regions, necessitating both user equipment (UE) and remote radio units (RRUs) to cover multiple non-contiguous mm-wave bands (e.g., at 24.5/28/37/39/43.5 Giga hertz (GHz)) or even higher 48-53 GHz band to support multi-standard communication and international roaming services. Phased array and multiple-input multiple-output (MIMO) transceiver architectures are extensively utilized for beamforming and null-steering interference suppression to improve the mm-wave link performance and massive spatial diversity. Thus, multiple data streams can be adopted into two-dimensional, frequency and space divisions to support high-throughput spectral and spatial signal multiplexing.

However, in order to cover such wideband operation, 24.5-43.5 GHz, conventional transceiver architectures necessitate several mm-wave local oscillator (LO) generations with several phase locked loops (PLLs), causing a large area, high power consumption, and requiring higher LO input swing. This can be extremely difficult to generate, especially at mm-wave, such as wideband LO source off-chip. Thus, there is a need for an on-chip mm-wave transceiver (TRX) array architecture with a LO generation that combines multiple multipliers to reduce burden on LO signal generation.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
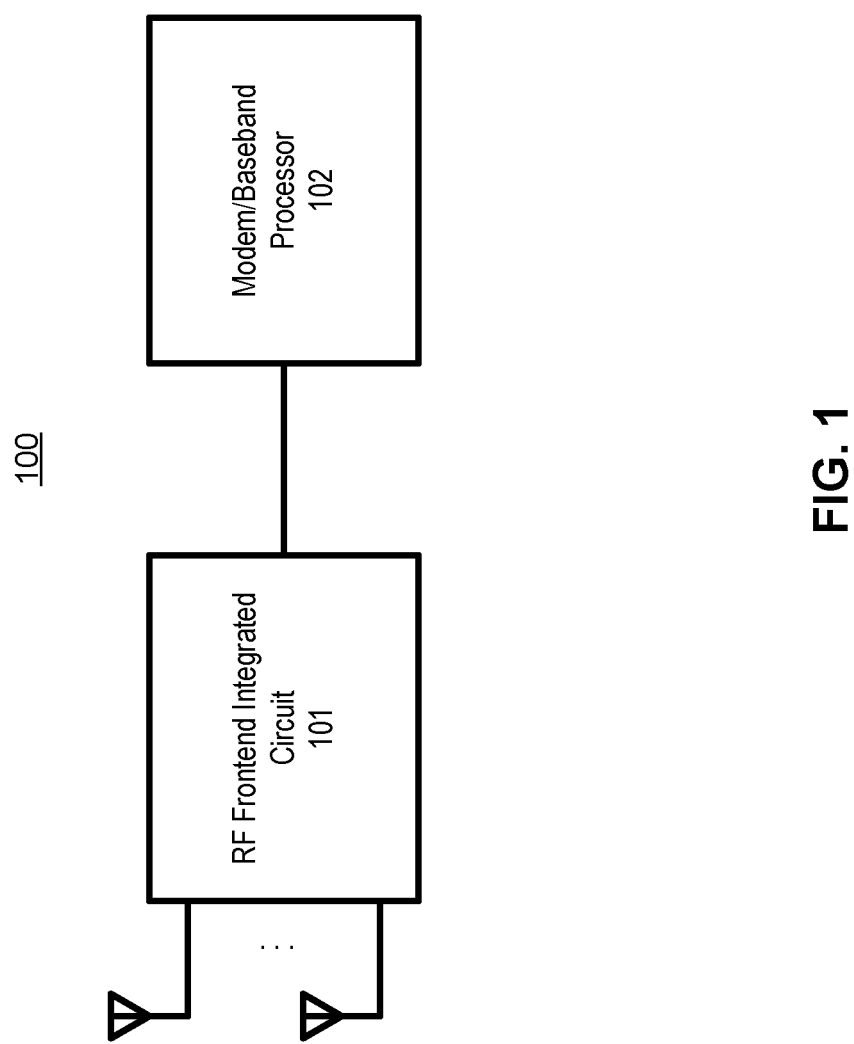
FIG. 1 is a block diagram illustrating an example of a wireless communication device according one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The present disclosure describes embodiments of mm-wave transceiver array architecture with an LO generator that combines multiple frequency multipliers to reduce burden on the LO generator. In this described embodiment, only one RF PLL generator operating at a PLL operating frequency is required instead of a mm-wave PLL. The PLL operating frequency is outside of the RF frequency band. In the LO signal generation, the frequency multipliers (e.g., a doubler, a tripler, or a quadrupler, etc.) are utilized to upscale the PLL operating frequency so that the high-band (HB) and low-band (LB) LO signal generation can share the same RF PLL generator. Moreover, the transceiver array architecture also supports a dual polarization and a broadband image rejection. These features enable future communications such as, (1) enhanced mobile broadband bandwidths for AR/VR (augmented reality/virtual reality), (2) high-speed MIMO transceiver system, and (3) mm-wave multi-spectrum data link realization.

According to some embodiments, a radio frequency (RF) frontend integrated circuit (IC) device includes a first RF transceiver to transmit and receive RF signals within a first frequency band. The RF frontend IC device further includes a second RF transceiver to transmit and receive RF signals within a second frequency band that is different than the first frequency band. The RF frontend IC device also includes a converter including a down-converter and an up-converter coupled to the first and second RF transceivers. Additionally, the RF frontend IC device includes a multi-band local oscillator (LO) generator coupled to the converter to provide LO signals to the converter. The multi-band LO generator includes a phase-lock loop (PLL) circuit operating at a PLL operating frequency. The PLL operating frequency is outside of the first frequency band and the second frequency band.

The multi-band LO generator also includes a first frequency multiplier coupled to the PLL circuit to upscale the PLL operating frequency and to generate a first LO signal having a first LO frequency within a first predetermined proximity from the first frequency band. Additionally, the multi-band LO generator includes a second frequency multiplier coupled to the PLL circuit to upscale the PLL operating frequency and to generate a second LO signal having a second LO frequency within a second predetermined proximity from the second frequency band. The first and second RF transceivers, the converter, and the multiband LO generator may be embedded within a single IC chip.

According to one embodiment, an RF frontend IC device includes a first RF transceiver to transmit and receive RF signals within a first predetermined frequency band and a second RF transceiver to transmit and receive RF signals within a second predetermined frequency band. The RF frontend IC device further includes a full-band frequency synthesizer coupled to the first and second RF transceivers to perform frequency synthetization in a wide frequency spectrum, including the first and second frequency bands. The full-band frequency synthesizer generates a first LO signal and a second LO signal for the first RF transceiver and the second RF transceiver to enable the first RF transceiver and the second RF transceiver to transmit and receive RF signals within the first frequency band and the second frequency band respectively. The first RF transceiver, the second RF transceiver, and the full-band frequency synthesizer are integrated within a single IC chip.

In one embodiment, the first LO frequency of the first LO signal is within a first range of LO frequencies approximately ranging from 17 Giga hertz (GHz) to 22 GHz. The second LO frequency of the second LO signal is within a second range of LO frequencies approximately ranging from 29.5 GHz to 36 GHz.

In one embodiment, the RF frontend IC device further includes a third RF transceiver to transmit and receive RF signals within a third frequency band that is different than the first and second frequency bands. The multi-band LO generator further includes a third frequency multiplier coupled to the PLL circuit to upscale the PLL operating frequency and to generate a third LO signal having a third LO frequency within a third predetermined proximity from third frequency band. The third LO frequency of the third LO signal is within a third range of LO frequencies approximately ranging from 40.5 GHz to 45.5 GHz.

In one embodiment, the PLL operating frequency is within a range of PLL frequencies approximately ranging from 8.5 GHz to 12 GHz. The first frequency band is within a first range of frequencies approximately ranging from 24.5 GHz to 29.5 GHz. The second frequency band is within a second range of frequencies approximately ranging from 37 GHz to 43.5 GHz. The third frequency band is within a third range of frequencies approximately ranging from 48 GHz to 53 GHz. A first frequency input to the first frequency multiplier is within a first range of input frequencies approximately ranging from 8.5 GHz to 11 GHz. A second frequency input to the second frequency multiplier is within a second range of input frequencies approximately ranging from 9.83 GHz to 12 GHz. A third frequency input to the third frequency multiplier is within a third range of input frequencies approximately ranging from 10.125 GHz to 11.375 GHz. Note that although two frequency bands have been described throughout this application, more or wider frequency bands may also be applicable herein.

In one embodiment, the PLL circuit includes a charge pump, a loop filter coupled to the charge pump, a voltage-controlled oscillator (VCO) coupled to the loop filter for providing the PLL operating frequency, and a programmable divider with a phase shift (PS) counter providing a feedback loop from the VCO to the charge pump.

In one embodiment, the RF frontend IC device further includes a power combiner/divider coupled between the first and second transceivers and the multi-band local oscillator (LO) generator. The power combiner is configured to combine a number of RF sub-signals received from one of the first and second transceivers to generate the RF signal. Each of the number of RF sub-signals corresponds to one of the first and second transceivers. The power divider is configured to divide the RF signal into the number of RF sub-signals, where each of the RF sub-signals is provided to one of the first and second transceivers to be transmitted. The RF frontend IC device also includes an in-phase/quadrature (I/Q) generator being configured to receive the LO signals and to generate a 90-degree mm-wave phase shift signal for a band-selective image signal rejection. The RF frontend IC device additionally includes an IF RC-CR poly-phase filter (PPF) being configured to reject an image signal of the RF signal.

In one embodiment, the band-selective image signal rejection chooses a low-side injection of a selected one of the plurality of LO signals used for an up/down conversion. A low-side injection of an LO signal refers to injecting an LO signal having a frequency that is lower than the frequency of the corresponding RF signals to be processed.

According to another aspect, a mobile device includes a baseband processor and an RF frontend device coupled to the baseband processor. The RF frontend device includes at least some of the components as described above.

FIG. 1 is a block diagram illustrating an example of a wireless communication device according one embodiment of the invention. Referring to FIG. 1, wireless communication device 100, also simply referred to as a wireless device, includes, among others, an RF frontend integrated circuit (IC) 101 and a modem/baseband processor 102. Wireless device 100 can be any kind of wireless communication devices such as, for example, mobile phones, laptops, tablets, network appliance devices (e.g., Internet of thing or IOT appliance devices), etc.

Figure 2:
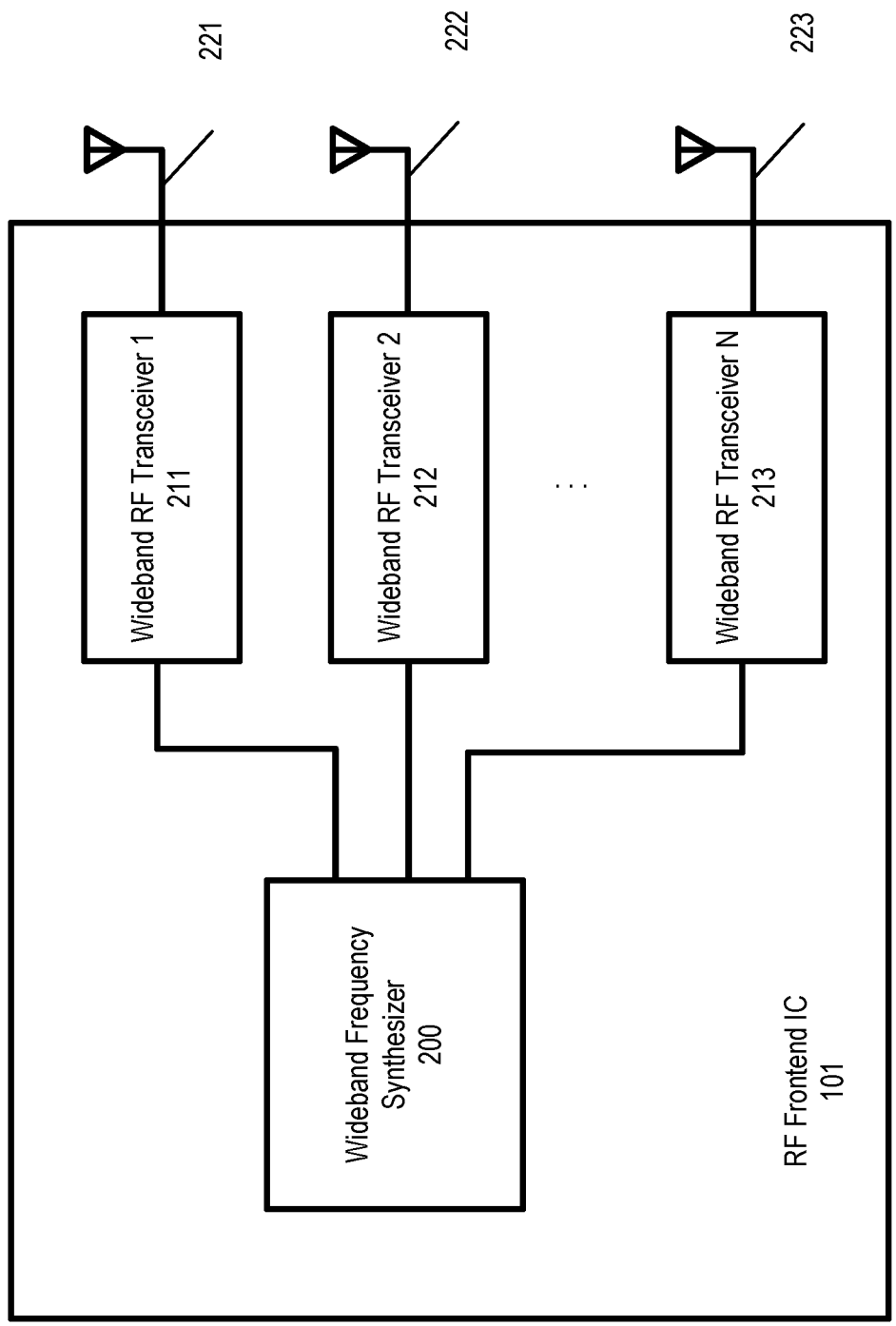
FIG. 2 is a block diagram illustrating an example of an RF (radio frequency) frontend integrated circuit according to one embodiment of the invention.

FIG. 2 is a block diagram illustrating an example of an RF frontend integrated circuit according to one embodiment of the invention. Referring to FIG. 2, RF frontend IC 101 includes, among others, a full-band frequency synthesizer 200 coupled to an array of RF transceivers 211-213. Each of transceivers 211-213 is configured to transmit and receive RF signals within a particular frequency band or a particular range of RF frequencies via one of RF antennas 221-223. In one embodiment, each of transceivers 211-213 is configured to receive a LO signal from full-band frequency synthesizer 200. The LO signal is generated for the corresponding frequency band. The LO signal is utilized to mix, modulate, demodulated by the transceiver for the purpose of transmitting and receiving RF signals within the corresponding frequency band.

Figure 3:
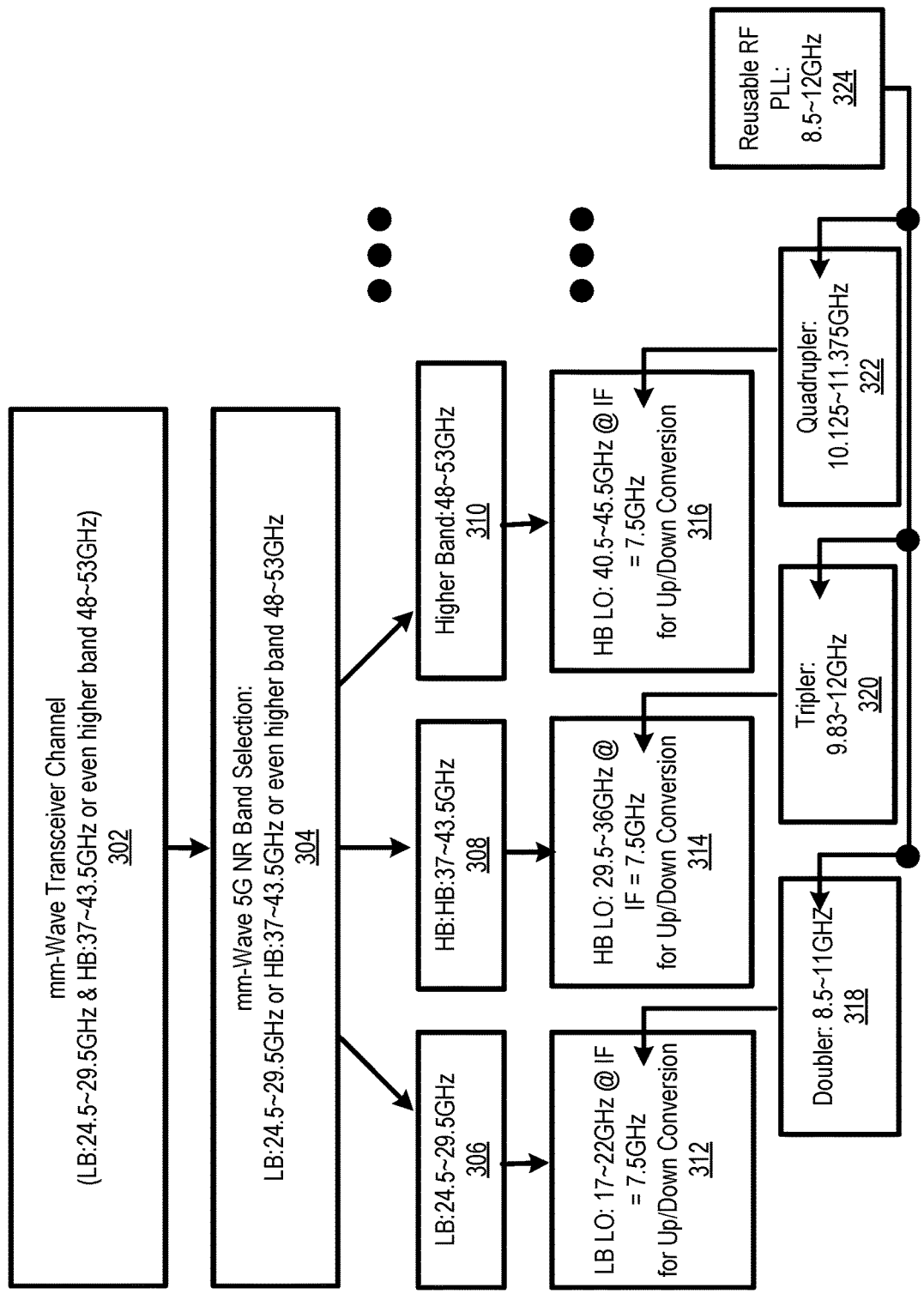
FIG. 3 is a processing flow diagram illustrating an example of a mm-wave 5G NR transceiver architecture frequency design according to another embodiment of the invention.

FIG. 3 is a processing flow diagram illustrating an example of a mm-wave 5G NR transceiver architecture frequency design according to another embodiment of the invention. In the illustrated example depicted by the flow chart, a first frequency band (e.g., LB) 306 and a second frequency band (e.g., HB) 308 (mm-wave) of RF signals are first detected by a (mm-wave) 5G NR band selection circuit 304 after the RF signals are received by an array of RF transceivers (e.g., 302). In one embodiment, a third frequency band (e.g., higher band) 310 can also be detected by the (mm-wave) 5G NR band selection circuit. As shown in FIG. 2, in one embodiment, a first RF transceiver (e.g., 211), for example, can be configured to transmit and receive RF signals within the first frequency band 306. A second RF transceiver (e.g., 212) can be configured to transmit and receive RF signals within the second frequency 308 band that is different than the first frequency band 306. The first frequency band 306 is approximately ranging 24.5-29.5 GHz, the second frequency band 308 is approximately ranging 37-43.5 GHz, and the third frequency band 310 is approximately ranging 48-53 GHz.

A multi-band local oscillator (LO) generator can be coupled to a converter to provide LO signals (e.g., 312, 314, 316, etc.) to the converter. The multi-band LO generator can include a phase-lock loop (PLL) circuit 324 operating at a PLL operating frequency, wherein the PLL operating frequency is outside of the first frequency band (e.g., approximately ranging 24.5-29.5 GHz) and the second frequency band (approximately ranging 37-43.5 GHz). As depicted in FIG. 3, in one embodiment for example, the intermediate frequency (IF) can be set to a frequency value of approximately 7.5 GHz.

When the first frequency band (e.g., LB 306) of RF signals is detected, the first frequency band of RF signals is processed with a first LO signal (e.g., LB LO signal 312) for an up-conversion or a down conversion by the converter. The first LO signal can be generated by a frequency multiplier (e.g., 318) coupled to the PLL circuit 324. The first frequency band of LO signal has a first range of LO frequencies approximately ranging from 17 GHz to 22 GHz within a first predetermined proximity from the first frequency band 306 (approximately ranging 24.5-29.5 GHz). Note that the LO frequency is lower than the corresponding RF frequency herein, which is referred to as a low-side LO signal injection. In one embodiment, the LO frequency does not overlap with the corresponding RF frequency to reduce the interference. The first LO frequency of the first LO signal is set far apart from the RF signals within the first frequency band which in turn avoiding LO pulling or an interference effect. Accordingly, the LO pulling can be reduced or avoided by significantly setting the first LO frequency apart from the RF signals. The multiplier 318 frequency input is a dividing ration of 2 on the first LO signal (17-22 GHz), which is equivalent to approximately ranging from 8.5 to 11 GHz. Accordingly, The PLL operating frequency can have a lower operating frequency (8.5-11 GHz).

In another embodiment, when the second frequency band (e.g., HB) of RF signals is detected, the second frequency band of RF signals is processed with a second LO signal for an up-conversion or a down conversion by the converter. The second LO signal can be generated by a frequency multiplier (e.g., 320) coupled to the PLL circuit 324. The second LO signal has a second LO frequency (approximately ranging from 29.5 GHz to 36 GHz) within a second predetermined proximity from the second frequency band (approximately ranging 37-43.5 GHz). The second LO frequency of the second LO signal is far away from the RF signals within the second frequency band 308 which in turn avoids an LO pulling or an interference effect. The multiplier 320 frequency input is, a dividing ration of 3 on the second LO signal 29.5-36 GHz which is equivalent to approximately ranging from 9.83 to 12 GHz. Accordingly, the PLL operating frequency can have a lower operating frequency (9.83-12 GHz) and better phase noise. Note that a frequency multiplier is utilized to multiply or upscale a frequency. However, other frequency converters may also be utilized to convert or modify the frequency of an LO signal.

In a further disclosed embodiment, a third RF transceiver can be configured to transmit and receive RF signals within a third frequency band 310 that is different than the first 306 and second 308 frequency bands. These frequency bands are non-overlapped frequency bands. For example, the third frequency band 310 has a third range of frequencies approximately ranging from 48 GHz to 53 GHz. The third LO signal can be generated by a frequency multiplier (e.g., quadrupler 322) coupled to the PLL circuit 324. The third LO signal has a third LO frequency (approximately ranging from 40.5 GHz to 45.5 GHz) within a third predetermined proximity from the third frequency band (approximately ranging 48-53 GHz).

The third LO frequency of the third LO signal is far away from the RF signals within the third frequency band 310 in turn avoiding an LO pulling or an interference effect. The multiplier frequency input is, a dividing ration of 4 on the third LO signal 40.5 GHz-45.5 GHz, which is equivalent to approximately ranging from 10.125 to 11.375 GHz. The PLL operating frequency can have a lower operating frequency (10.125-11.375 GHz) and better phase noise. Note that although there are only three multipliers as shown in FIG. 3, more multipliers may also be coupled to PLL circuit 324 to accommodate more frequency bands of RF signals. Since frequency multipliers are utilized, a single PLL circuit having a lower PLL operating frequency can be utilized. As a result, a smaller package of the IC can be maintained. In addition, since lower PLL operating frequency is farther away from the frequencies of the RF signals, the signal interference can be reduced.

Figure 4:
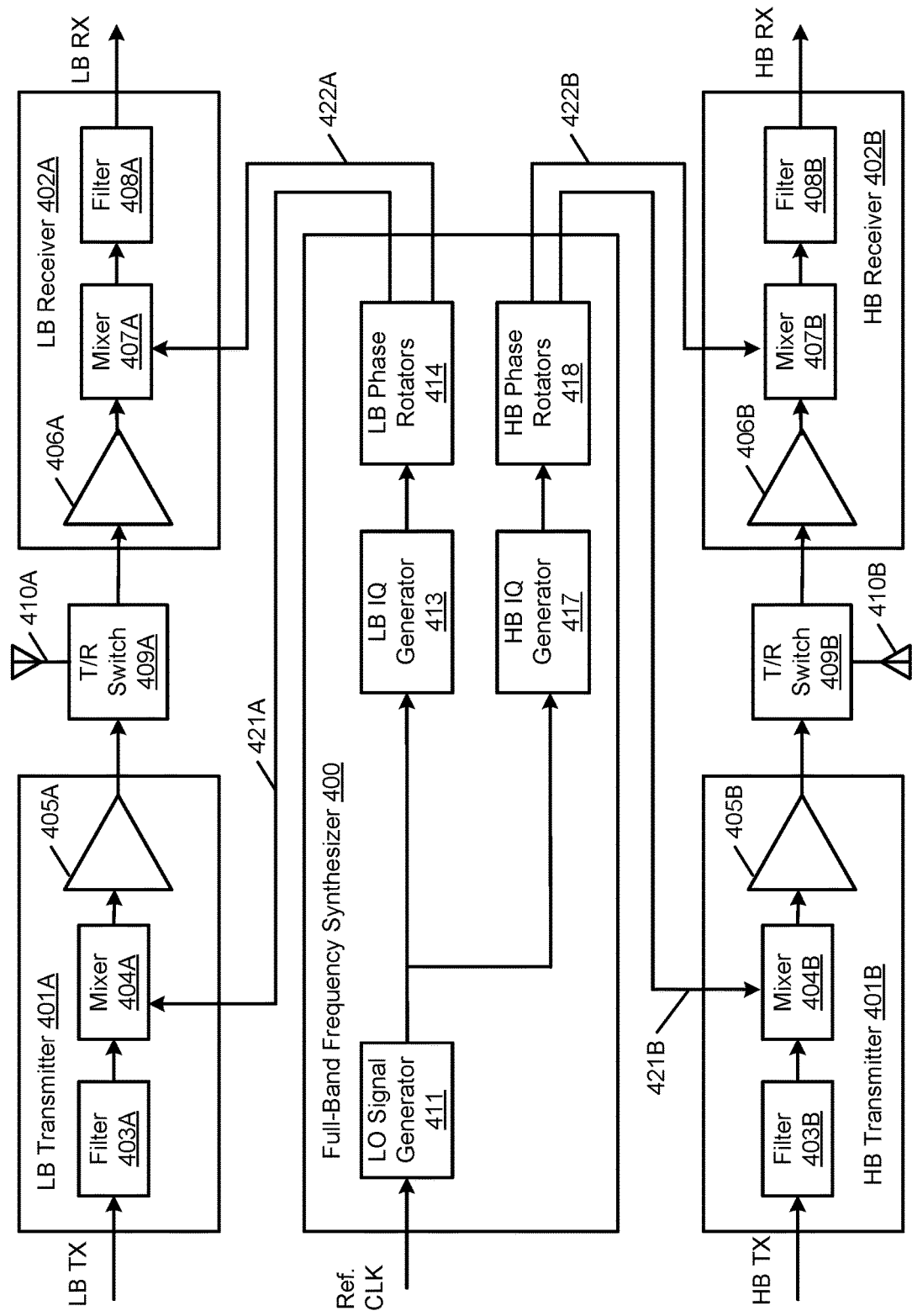
FIG. 4 is a block diagram illustrating an RF frontend integrated circuit according to another embodiment of the invention.

FIG. 4 is a block diagram illustrating an RF frontend integrated circuit according to another embodiment of the invention. Referring to FIG. 4, full-band frequency synthesizer 400 may represent full-band frequency synthesizer 101 as described above. In one embodiment, full-band frequency synthesizer 400 is communicatively coupled to an array of transceivers, each transceiver corresponding to one of a number of frequency bands. In this example, full-band frequency synthesizer 400 is coupled to transmitter 401A, receiver 402A, transmitter 401B, and receiver 402B. Transmitter 401A and receiver 402A may be a part of a first transceiver operating in a lower frequency band, referred to as an LB transmitter and LB receiver. Transmitter 401B and receiver 402B may be a part of a second transceiver operating in a higher frequency band, referred to as a HB transmitter and HB receiver. Note that although there are only two transceivers as shown in FIG. 4, more transceivers may also be coupled to full-band frequency synthesizer 400 as shown in FIG. 2.

Again, in this example as shown in FIG. 4, there are two frequency bands covered by the frequency synthesizer 400. However, more frequency bands may be implemented within the integrated RF frontend. If there are more frequency bands to be implemented, more sets of frequency multipliers may be required.

In one embodiment, frequency synthesizer 400 includes, but is not limited to, LO signal generator circuitry or block 411, LB in-phase/quadrature (IQ) generator 413, and LB phase rotators 414. A PLL is a control system that generates an output signal whose phase is related to the phase of an input signal. While there are several differing types, it is easy to initially visualize as an electronic circuit consisting of a variable frequency oscillator and a phase detector. The oscillator generates a periodic signal, and the phase detector compares the phase of that signal with the phase of the input periodic signal, adjusting the oscillator to keep the phases matched. Bringing the output signal back toward the input signal for comparison is called a feedback loop since the output is "fed back" toward the input forming a loop.

Keeping the input and output phase in lock step also implies keeping the input and output frequencies the same. Consequently, in addition to synchronizing signals, a phase-locked loop can track an input frequency, or it can generate a frequency that is a multiple of the input frequency. These properties are used for computer clock synchronization, demodulation, and frequency synthesis. Phase-locked loops are widely employed in radio, telecommunications, computers and other electronic applications. They can be used to demodulate a signal, recover a signal from a noisy communication channel, generate a stable frequency at multiples of an input frequency (frequency synthesis), or distribute precisely timed clock pulses in digital logic circuits such as microprocessors.

Referring back to FIG. 4, LO signal generator block 411 is to receive a clock reference signal and to lock onto the frequency of the clock reference signal to generate a first LO signal, i.e., a low-band LO signal or LBLO signal. The first LO signal may be optionally buffered by a LO buffer (not shown). Based on the LBLO signal, LB IQ generator 413 generates IQ signals that are suitable for mixing, modulating, and demodulating in-phase and quadrature components of RF signals. The IQ signals may be rotated by a predetermined angle or delayed by LB phase rotators 414. The rotated IQ signals are then provided to LB transmitter 401A and receiver 402A. Particularly, the IQ signals may include transmitting IQ (TXIQ) signals 421A to be provided to LB transmitter 401A and in-phase and quadrature receiving IQ (RXIQ) signals 422A to be provided to LB receiver 402A. In some embodiments, phase shifting can be performed in LO path.

In one embodiment, frequency synthesizer 400 further includes HB IQ generator 417, and HB phase rotators 418. Referring to FIG. 4, HB IQ generator 417 generates IQ signals that are suitable for mixing, modulating, and demodulating in-phase and quadrature components of RF signals in a high band frequency range. In electrical engineering, a sinusoid with angle modulation can be decomposed into, or synthesized from, two amplitude-modulated sinusoids that are offset in phase by one-quarter cycle (π/2 radians). All three functions have the same frequency. The amplitude modulated sinusoids are known as in-phase and quadrature components. Some people find it more convenient to refer to only the amplitude modulation (baseband) itself by those terms.

The IQ signals may be rotated by a predetermined angle or delayed by HB phase rotators 418. The rotated IQ signals are then provided to HB transmitter 401B and receiver 402B. Particularly, the IQ signals may include transmitting IQ (TXIQ) signals 421B to be provided to HB transmitter 401B and in-phase and quadrature receiving IQ (RXIQ) signals 422B to be provided to HB receiver 402B. Thus, components 413-414 are configured to generate TXIQ and RXIQ signals for LB transmitter 401A and LB receiver 402A, while components 417-418 are configured to generate TXIQ and RXIQ signals for HB transmitter 401B and HB receiver 402B. If there are more transmitters and receivers of more frequency bands involved, more sets of components 413-414 and/or components 417-418 may be maintained by frequency synthesizer 400 for generating the necessary TXIQ and RXIQ signals for the additional frequency bands.

In one embodiment, LB transmitter 401A includes a filter 403A, a mixer 404A, and an amplifier 405A. Filter 403A may be a low-pass (LP) filter that receives LB transmitting (LBTX) signals to be transmitted to a destination, where the LBTX signals may be provided from a baseband processor such as baseband processor 102. Mixer 401A (also referred to as an up-convert mixer or an LB up-convert mixer)) is configured to mix and modulate the LBTX signals onto a carrier frequency signal based on TXIQ signal provided by LB phase rotators 414. The modulated signals (e.g., low-band RF or LBRF signals) are then amplified by amplifier 405A and the amplified signals are then transmitted to a remote receiver via antenna 410A.

In one embodiment, LB receiver 402A includes an amplifier 406A, mixer 407A, and filter 408A. Amplifier 406A is to receive LBRF signals from a remote transmitter via antenna 410A and to amplify the received RF signals. The amplified RF signals are then demodulated by mixer 407A (also referred to as a down-convert mixer or an LB down-convert mixer) based on RXIQ signal received from LB phase rotators 414. The demodulated signals are then processed by filter 408A, which may be a low-pass filter. In one embodiment, LB transmitter 401A and LB receiver 402A share antenna 410A via a transmitting and receiving (T/R) switch 409A. T/R switch 409A is configured to switch between LB transmitter 401A and receiver 402A to couple antenna 410A to either LB transmitter 401A or LB receiver 402A at a particular point in time.

Similarly, HB transmitter 401B includes filter 403B, mixer 404B (also referred to as a HB up-convert mixer), and amplifier 405B having functionalities similar to filter 403A, mixer 404A, and amplifier 405A of LB transmitter 401A, respectively, for processing high-band transmitting (HBTX) signals. HB receiver 402B includes filter 406B, mixer 407B (also referred to as a HB down-convert mixer), and filter 408B having functionalities similar to amplifier 406A, mixer 407A, and filter 408A of LB receiver 402A, respectively, for processing high-band receiving (HBRX) signals. HB transmitter 401B and HB receiver 402B are coupled to antenna 410B via T/R switch 409B similar to the configuration of LB transmitter 401A and receiver 402A.

Figure 5:
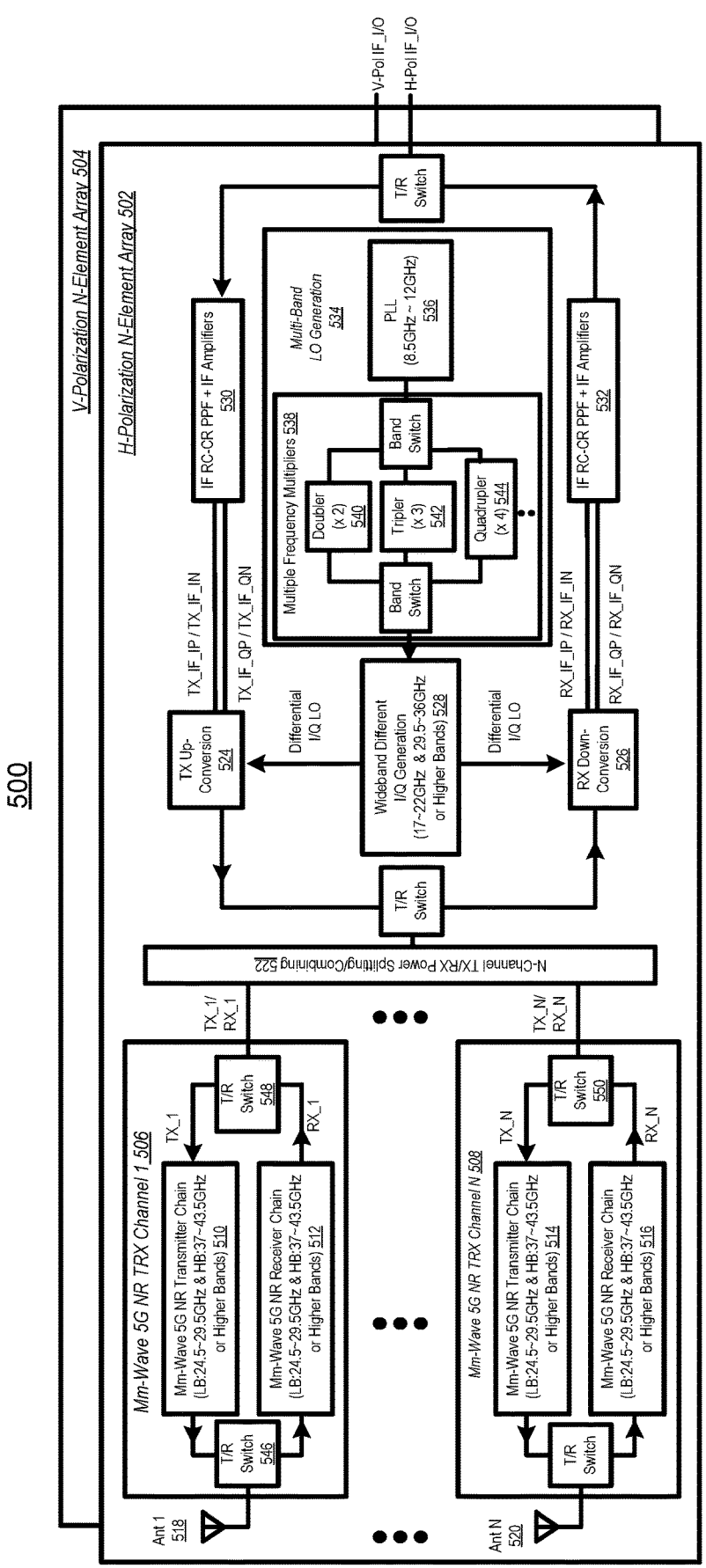
FIG. 5 is a block diagram illustrating an example of mm-wave transceiver array circuit with a sharable RF PLL for dual-polarization wideband image rejection according to another embodiment of the invention.

FIG. 5 illustrates an example of mm-wave transceiver array circuit with a sharable RF PLL for dual-polarization wideband image rejection according to another embodiment of the invention. Referring to FIG. 5, for example, RF frontend IC device 500 includes a first polarization (e.g., a horizontal polarization) circuitry 502 (denoted by "H-polarization N-Element Array") and a second polarization (e.g., a vertical polarization) circuitry 504 (denoted by "V-polarization N-Element Array").

Each polarization circuitry includes N-element scalable transceivers which is composed by an antenna array (e.g., Ant 1 518, . . . , Ant N 520), a mm-wave 5G transceiver channel array (e.g., mm-wave 5G TRX channel 1 (e.g., 506), . . . , mm-wave 5G TRX channel N (e.g., 508)), an N-channel TX/RX power splitting/combining circuitry 522

(e.g., power combiner/divider), a TX up-conversion circuit 524, an RX down-conversion circuit 526, a wideband in-phase/quadrature (I/Q) generator 528, IF RC-CR poly-phase filters (PPF) (e.g., 530 and 532) configured for broadband image rejection, and a multi-band LO signal generator 534.

The mm-wave 5G transceiver channel 506 is configured to transmit/receive RF signals for a single-channel. The single-channel can be a single frequency channel. RC-CR poly-phase filters (PPF) can be configured to split the IF signal into the I and Q paths at the desired frequency. Note that although there are only two transceivers as shown in FIG. 5, more transceivers may also be coupled to full-band frequency synthesizer 400 as shown in FIG. 2.

The transmitter chain (e.g., 510) and receiver chain (e.g., 512) can be communicatively coupled via a T/R switch 546. The T/R switch 546 is then coupled to the antenna (e.g., Ant 1 518). The transmitter chain 510 and the receiver chain 512 can be coupled to the power combiner/divider 522 via a T/R switch 548. In one embodiment, for example, PPF is to generate a third differential IF signal based on the first and second differential IF signals. In one embodiment, the power combiner/divider 522 is coupled between the first and second transceivers and the multi-band LO signal generator 534.

The power combiner is configured to combine a number of RF sub-signals received from one of the first and second transceivers to generate the RF signal. Each of the number of RF sub-signals corresponds to one of the first and second transceivers. The power divider is also configured to divide the RF signal into the number of RF sub-signals, where each of the number of RF sub-signals is provided to one of first and second transceivers to be transmitted. The wideband in-phase/quadrature (I/Q) generator 528 generates differential I/Q LO for the TX up-conversion 524 and the RX down-conversion 526.

Figure 6:
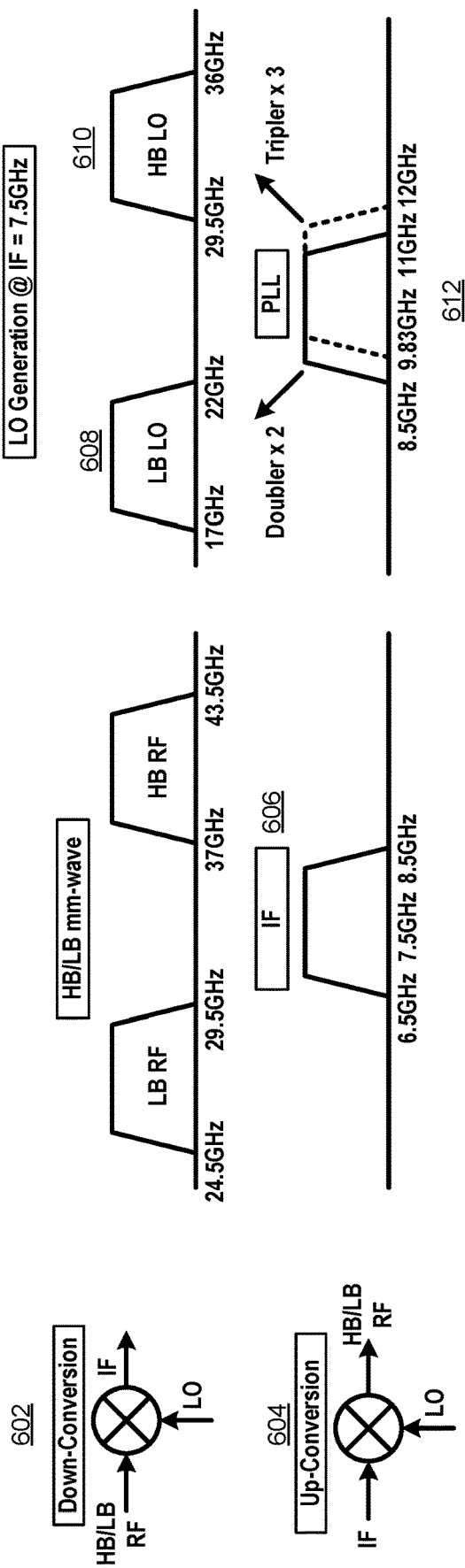
FIG. 6 is a block diagram illustrating an LO generation frequency planning according to another embodiment of the invention.

FIG. 6 is a block diagram illustrating an LO generation frequency planning for up/down-conversion of HB/LB mm-wave signal according to another embodiment of the invention. Referring to FIG. 6, a frequency converter including a down-converter 602 and an up-converter 604 is to convert the LO signal 606 generated from the PLL block (e.g., 536) to a signal with higher frequency (e.g., within a higher frequency band). As depicted in FIG. 6, in one embodiment for example, the intermediate frequency (IF) 606 can be set to a frequency value of 7.5 GHz. In one embodiment, a multi-band local oscillator (LO) generator (e.g., 534) includes a first frequency multiplier (e.g., doubler 540) to double the frequency of the PLL operating frequency 612 (e.g., approximately ranging 8.5-12 GHz).

The first frequency multiplier 540 generates a first LO signal 608 having the first LO frequency approximately twice as the PLL operating frequency 612. The second frequency multiplier (e.g., tripler 542) generates a second LO signal 610 having the second LO frequency approximately thrice as the PLL operating frequency 612. Note that in this example, the second LO frequency 610 is thrice as PLL operating frequency 612. However, a multi-band local oscillator (LO) generator 534 can generate a frequency in any frequency range. If there are more frequency bands to be integrated within the RF frontend device, more frequency multipliers may be utilized to upscale a PLL operating frequency to a number of other lower or higher frequencies.

Therefore, the PLL operating frequency can be configured to be within a range of PLL frequencies approximately ranging from 8.5 GHz to 12 GHz. As a result, only one sharable PLL operating frequency is required for each the first and second LO signal generation. This can save on-chip area, power consumption, and avoid an LO pulling/interference signal effect since this embodiment of the RF frontend IC device operates at a much lower frequency compared to the conventional transceiver design.

Figure 7:
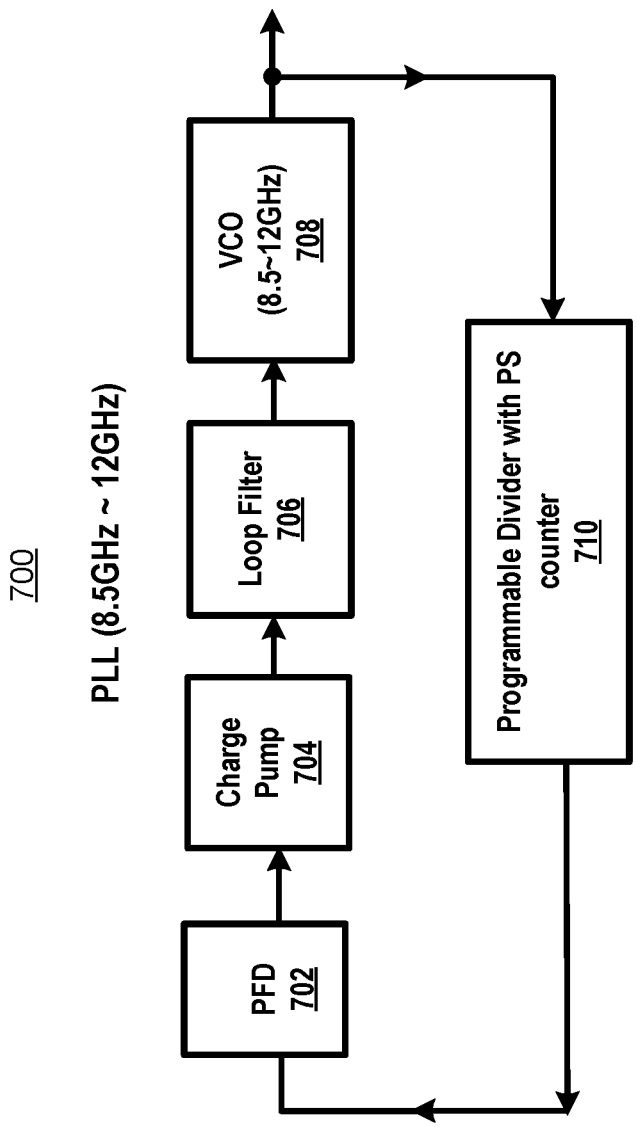
FIG. 7 is a block diagram illustrating an RF PLL circuit according to one embodiment.

FIG. 7 is a block diagram illustrating an example of an RF PLL circuit 700 according to one embodiment. Referring to FIG. 7, the RF PLL circuit 700 may represent PLL block 536 as described above. In one embodiment, for example, the RF PLL circuit 700 includes a phase frequency detector (PFD) 702, a charge pump 704 coupled to the PFD 702, a loop filter 706 coupled to the charge pump 704, a voltage-controlled oscillator (VCO) 708 coupled to the loop filter 706 for providing the PLL operating frequency, and a programmable divider with a phase shift (PS) counter 710 providing a feedback loop from the VCO 706 to the PFD 702. In one embodiment, VCO 708 can generate a PLL operating frequency (e.g., approximately ranging 8.5-12 GHz). A charge pump 704 can be a DC to DC converter that uses capacitors as charge storage to raise or lower an output voltage. The charge pump 704 can raise or lower a voltage to control the frequency of oscillation of the VCO 708.

Figure 8:
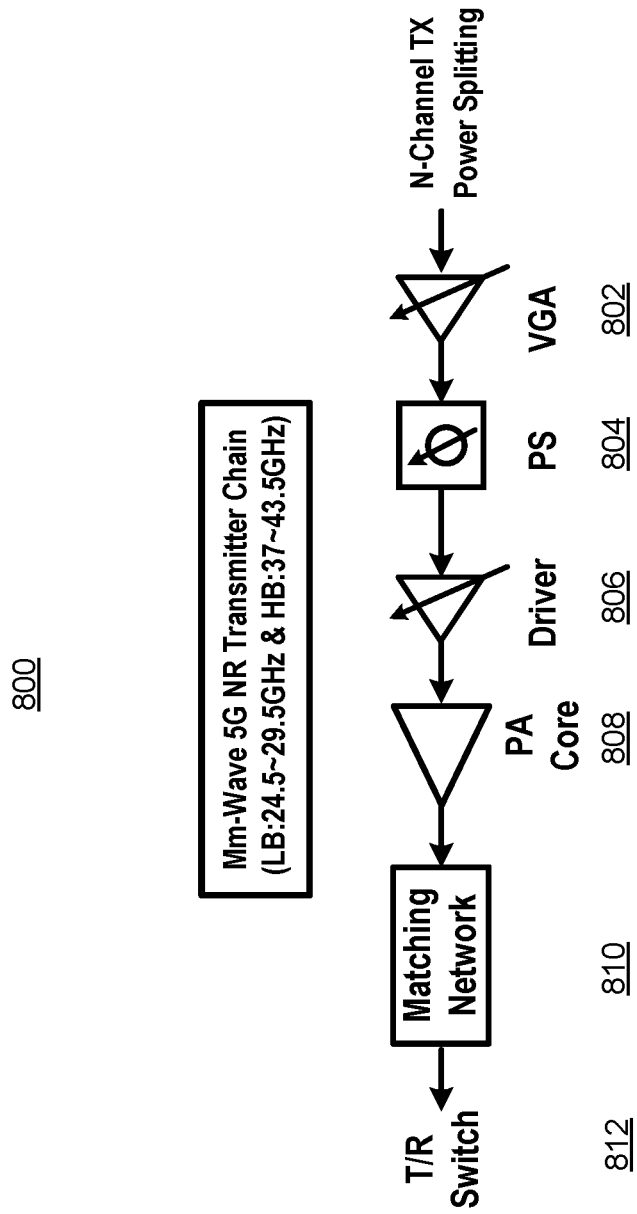
FIG. 8 is a block diagram illustrating an example of a mm-wave 5G transmitter chain according to one embodiment.

FIG. 8 is a block diagram illustrating an example of a mm-wave 5G transmitter chain 800 according to one embodiment. Each mm-wave TX/RX chain processes with mm-wave phase shift to achieve analog beamforming for the N-element array. Transmitter chain 800 can represent the transmitter chain 510 in FIG. 5. In FIG. 5, the transmitter chain 510 is communicatively connected to the antenna 518 via a T/R switch 546. Referring back to FIG. 8, the transmitter chain 800 includes a voltage-controlled gain amplifier (VGA) 802, a mm-wave phase shifter (PS) 804, a driver 806, a wideband power amplifier (PA) core 808, and a matching network 810. The output of the matching network 810 is fed to the T/R switch 812 and then to the transceiver. In some embodiments, phase shifting can be performed in RF path.

In some embodiments, each of the transmit chains can be coupled between a front end antenna and a transmitting and receiving (T/R) switch and each of the transmit chains includes a voltage-controlled gain amplifier (VGA) arranged in each of the transmit chains to amplify an in-phase component of a transmit signal and a quadrature component of the transmit signal. Each of the transmit chains also includes a mm-wave phase shifter (PS) coupled to the VGA, a driver coupled to the PS, a wideband power amplifier (PA) core coupled to the driver, and a matching network coupled to the wideband power amplifier (PA) core.

In one embodiment, the VGA 802 is to add an adjustable gain element to the signal chain by increasing or decreasing the attenuation value. In one embodiment, the VGA 802 is to amplify the signals with different gains. In one embodiment, PS 804 is to receive the LO signal from the frequency synthesizer and to shift the LO signal according to a pre-determined shifted phase. The PA core 808 may require multiple cascaded gain stages, including VGA 802 and the driver 806 to meet the gain and efficiency requirements. The PS 804 is coupled to the VGA 802 to switch in different degrees in phases to generate quadrant signals.

Figure 9:
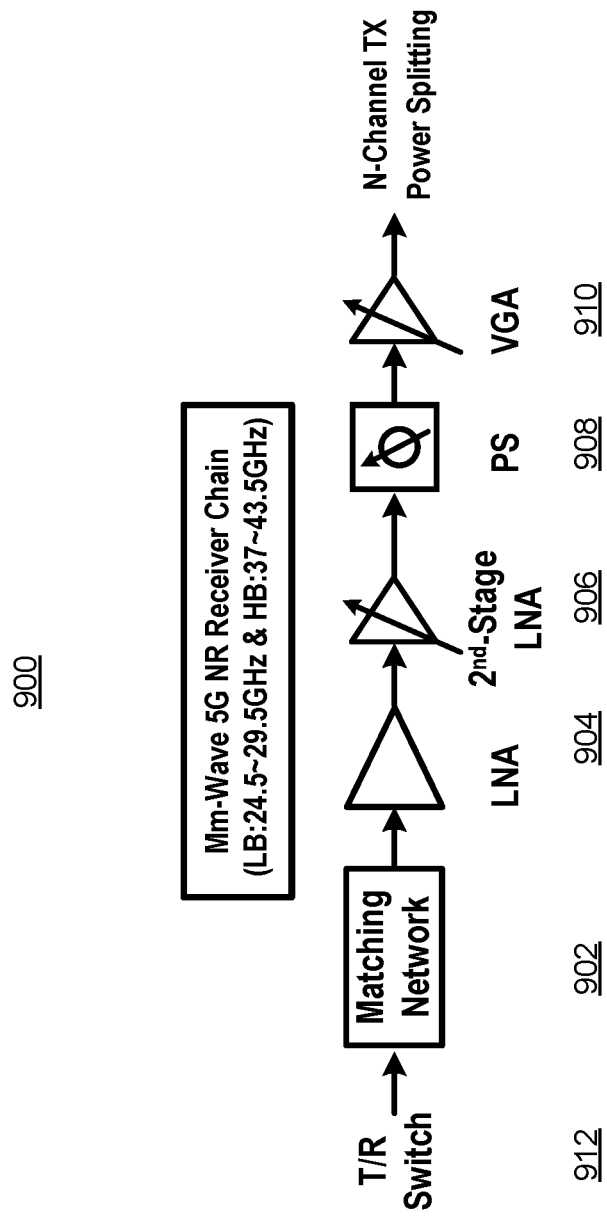
FIG. 9 is a block diagram illustrating an example of a mm-wave 5G receiver chain according to one embodiment.

FIG. 9 is a block diagram illustrating an example of a mm-wave 5G receiver chain 900 according to one embodiment. Receiver chain 900 can represent the receiver chain 512 in FIG. 5. Receiver chain 900 receives the RF signal from the front end antenna via a T/R switch 912. Each RX chain 900 includes a matching network 902, a low noise amplifier (LNA) 904 to receive and amplify RF signals, $2^{nd}$-stage LNA 906 following LNA 904, a PS 908, and a VGA 910. Regarding transmitting (TX) signal, the IF signal is up-converted by a TX up-conversion circuit (e.g., 524).

The up-converted IF signal is split by a N-channel TX power splitting circuit so the up-converted IF signal can be fed into each of TX chains. On the other hand, the receiving (RX) signal is combined by a N-channel RX power combining circuit and then down-converted to the IF signal by a RX down-conversion circuit (e.g., 526). The output of the HB/LB LO generator is fed to a wideband I/Q generator to generate a 90-degree mm-wave signal for image signal rejection purposes. In some embodiments, phase shifting can be performed in RF path.

In one embodiment, each of the receive chains can be coupled between a frontend antenna and T/R switch wherein each of the receive chains includes matching network coupled to the T/R switch, a low noise amplifier (LNA) coupled to the matching network, $2^{nd}$-stage LNA coupled to the LNA, a phase shifter (PS) coupled to the $2^{nd}$-stage LNA, and a VGA coupled to the VS. In some embodiments, each of the receive chains and the transmit chains process with mm-wave PS to achieve an analog beamforming for the first and the second arrays of the one or more transceivers.

Figure 10:
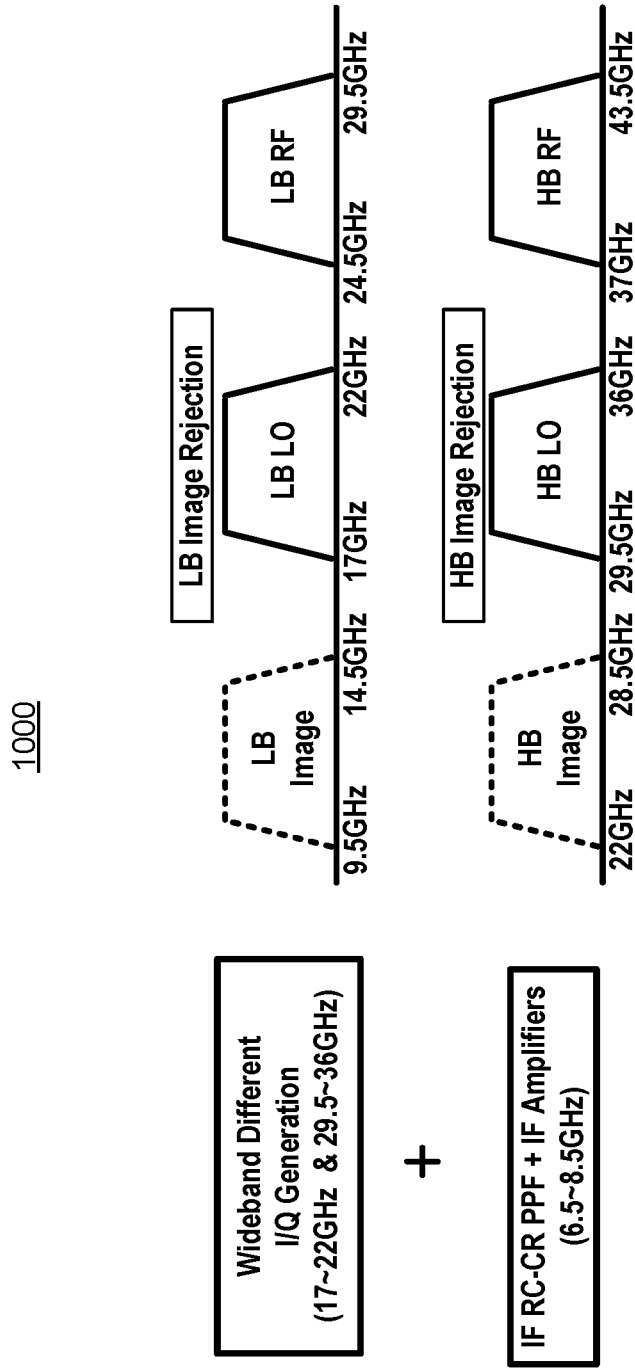
FIG. 10 is a block diagram illustrating an example of an LB/HB image rejection frequency planning according to one embodiment.

FIG. 10 is a block diagram illustrating an example of an LB/HB image rejection frequency planning according to one embodiment. The image signal rejection for the embodiment of the RF front end device architecture chooses the low-side LO injection for both LB up conversion and HB down conversion. Note that the low-side injection refers to the LO signal below the RF signal. The image signal rejection can be completed by LO I/Q and IF I/Q signal generation as shown in FIG. 5. With the corresponding image signals for LB/HB mm-wave signal shown in FIG. 10 and with the wideband LO mm-wave I/Q signal generation, the LB image and HB image signals can be rejected. In the end, the H-polarization and V-polarization IF signals are generated via the output T/R switch for each polarization I/O signals. Accordingly, band-selective image rejection is achieved using the embodiment of the N-element multi-band mm-wave 5G dual-polarization transmitter arrays.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency (RF) frontend integrated circuit (IC) device, the RF frontend IC device comprising:
a first RF transceiver to transmit and receive RF signals within a first frequency band;
a second RF transceiver to transmit and receive RF signals within a second frequency band that is different than the first frequency band;
a converter comprising a down-converter and an up-converter coupled to the first and second RF transceivers; and
a multi-band local oscillator (LO) generator coupled to the converter to provide LO signals to the converter, the multi-band LO generator including:
a phase-lock loop (PLL) circuit operating at a PLL operating frequency, wherein the PLL operating frequency is outside of and less than the first frequency band and the second frequency band,
a first frequency multiplier coupled to the PLL circuit to upscale the PLL operating frequency and to generate a first LO signal having a first LO frequency within a first predetermined proximity from the first frequency band, and
a second frequency multiplier coupled to the PLL circuit to upscale the PLL operating frequency and to generate a second LO signal having a second LO frequency within a second predetermined proximity from the second frequency band, wherein the first and second RF transceivers, the converter, and the multi-band LO generator are embedded within a single IC chip.

2. The RF frontend IC device of claim 1, wherein the first LO frequency of the first LO signal is within a first range of LO frequencies approximately ranging from 17 Giga hertz (GHz) to 22 GHz.

3. The RF frontend IC device of claim 1, wherein the second LO frequency of the second LO signal is within a second range of LO frequencies approximately ranging from 29.5 GHz to 36 GHz.

4. The RF frontend IC device of claim 1, wherein the RF frontend IC device further comprises a third RF transceiver to transmit and receive RF signals within a third frequency band that is different than the first and second frequency bands, wherein the multi-band LO generator further includes a third frequency multiplier coupled to the PLL circuit to upscale the PLL operating frequency and to generate a third LO signal having a third LO frequency within a third predetermined proximity from third frequency band, wherein the third LO frequency of the third LO signal is within a third range of LO frequencies approximately ranging from 40.5 GHz to 45.5 GHz.

5. The RF frontend IC device of claim 4, wherein the first frequency band is within a first range of frequencies approximately ranging from 24.5 GHz to 29.5 GHz, wherein the second frequency band is within a second range of frequencies approximately ranging from 37 GHz to 43.5 GHz, and wherein the third frequency band is within a third range of frequencies approximately ranging from 48 GHz to 53 GHz.

6. The RF frontend IC device of claim 4, wherein a first frequency input to the first frequency multiplier is within a first range of input frequencies approximately ranging from 8.5 GHz to 11 GHz, wherein a second frequency input to the second frequency multiplier is within a second range of input frequencies approximately ranging from 9.83 GHz to 12 GHz, and wherein a third frequency input to the third frequency multiplier is within a third range of input frequencies approximately ranging from 10.125 GHz to 11.375 GHz.

7. The RF frontend IC device of claim 1, wherein the PLL operating frequency is within a range of PLL frequencies approximately ranging from 8.5 GHz to 12 GHz.

8. The RF frontend IC device of claim 1, further comprising:
a power combiner/divider coupled between the first and second RF transceivers and the multi-band LO generator, the power combiner being configured to combine a number of RF sub-signals received from one of the first and second RF transceivers to generate the RF signal, each of the number of RF sub-signals corresponding to one of the first and second RF transceivers, the power divider being configured to divide the RF signal into the number of RF sub-signals, wherein each of the number of RF sub-signals is provided to one of the first and second RF transceivers to be transmitted;
a wideband in-phase/quadrature (I/Q) generator being configured to receive the LO signals and to generate a 90-degree mm-wave phase shift signal for a band-selective image signal rejection; and
an intermediate frequency (IF) RC-CR poly-phase filter (PPF) being configured to reject an image signal of the RF signal.

9. The RF frontend IC device of claim 8, wherein the band-selective image signal rejection chooses a low-side injection of a selected one of the LO signals used for an up/down conversion.

10. A radio frequency (RF) frontend integrated circuit (IC) device, the RF frontend IC device comprising:
a first RF transceiver to transmit and receive RF signals within a first frequency band;
a second RF transceiver to transmit and receive RF signals within a second frequency band that is different than the first frequency band;
a converter comprising a down-converter and an up-converter coupled to the first and second RF transceivers; and
a multi-band local oscillator (LO) generator coupled to the converter to provide LO signals to the converter, the multi-band LO generator including:
a phase-lock loop (PLL) circuit operating at a PLL operating frequency, wherein the PLL operating frequency is outside of the first frequency band and the second frequency band,
a first frequency multiplier coupled to the PLL circuit to upscale the PLL operating frequency and to generate a first LO signal having a first LO frequency within a first predetermined proximity from the first frequency band, and
a second frequency multiplier coupled to the PLL circuit to upscale the PLL operating frequency and to generate a second LO signal having a second LO frequency within a second predetermined proximity from the second frequency band, wherein the first and second RF transceivers, the converter, and the multi-band LO generator are embedded within a single IC chip,
wherein the PLL circuit comprises:
a charge pump;
a loop filter coupled to the charge pump;
a voltage-controlled oscillator (VCO) coupled to the loop filter for providing the PLL operating frequency; and
a programmable divider with a phase shift (PS) counter providing a feedback loop from the VCO to the charge pump.

11. A mobile device, comprising:
a baseband processor; and
a radio frequency (RF) frontend device coupled to the baseband processor, wherein the RF frontend device includes:
a first RF transceiver to transmit and receive RF signals within a first frequency band;
a second RF transceiver to transmit and receive RF signals within a second frequency band that is different than the first frequency band;
a converter comprising a down-converter and an up-converter coupled to the first and second RF transceivers; and
a multi-band local oscillator (LO) generator coupled to the converter to provide LO signals to the converter, the multi-band LO generator including:
a phase-lock loop (PLL) circuit operating at a PLL operating frequency, wherein the PLL operating frequency is outside of and less than the first frequency band and the second frequency band,
a first frequency multiplier coupled to the PLL circuit to upscale the PLL operating frequency and to generate a first LO signal having a first LO frequency within a first predetermined proximity from the first frequency band, and
a second frequency multiplier coupled to the PLL circuit to upscale the PLL operating frequency and to generate a second LO signal having a second LO frequency within a second predetermined proximity from the second frequency band, wherein the first and second RF transceivers, the converter, and the multi-band LO generator are embedded within a single IC chip.

12. The mobile device of claim 11, wherein the first LO frequency of the first LO signal is within a first range of LO frequencies approximately ranging from 17 Giga hertz (GHz) to 22 GHz.

13. The mobile device of claim 11, wherein the second LO frequency of the second LO signal is within a second range of LO frequencies approximately ranging from 29.5 GHz to 36 GHz.

14. The mobile device of claim 11, wherein the RF frontend IC device further comprises a third RF transceiver to transmit and receive RF signals within a third frequency band that is different than the first and second frequency bands, wherein the multi-band LO generator further includes a third frequency multiplier coupled to the PLL circuit to upscale the PLL operating frequency and to generate a third LO signal having a third LO frequency within the third frequency band, wherein the third LO frequency of the third LO signal is within a third range of LO frequencies approximately ranging from 40.5 GHz to 45.5 GHz.

15. The mobile device of claim 14, wherein the first frequency band is within a first range of frequencies approximately ranging from 24.5 GHz to 29.5 GHz, wherein the second frequency band is within a second range of frequencies approximately ranging from 37 GHz to 43.5 GHz, and wherein the third frequency band is within a third range of frequencies approximately ranging from 48 GHz to 53 GHz.

16. The mobile device of claim 14, wherein a first frequency input to the first frequency multiplier is within a first range of input frequencies approximately ranging from 8.5 GHz to 11 GHz, wherein a second frequency input to the second frequency multiplier is within a second range of input frequencies approximately ranging from 9.83 GHz to 12 GHz, and wherein a third frequency input to the third frequency multiplier is within a third range of input frequencies approximately ranging from 10.125 GHz to 11.375 GHz.

17. The mobile device of claim 11, wherein the PLL operating frequency is within a range of PLL frequencies approximately ranging from 8.5 GHz to 12 GHz.

18. The mobile device of claim 11, wherein the PLL circuit comprises:
a charge pump;
a loop filter coupled to the charge pump;
a voltage-controlled oscillator (VCO) coupled to the loop filter for providing the PLL operating frequency; and
a programmable divider with a phase shift (PS) counter providing a feedback loop from the VCO to the charge pump.

19. The mobile device of claim 11, wherein the RF frontend device further comprises:
- a power combiner/divider coupled between the first and second RF transceivers and the multi-band LO generator, the power combiner being configured to combine a number of RF sub-signals received from one of the first and second RF transceivers to generate the RF signal, each of the number of RF sub-signals corresponding to one of the first and second RF transceivers, the power divider being configured to divide the RF signal into the number of RF sub-signals, wherein each of the number of RF sub-signals is provided to one of the first and second RF transceivers to be transmitted;
- a wideband in-phase/quadrature (I/Q) generator being configured to receive the LO signals and to generate a 90-degree mm-wave phase shift signal for a band-selective image signal rejection; and
- an intermediate frequency (IF) RC-CR poly-phase filter (PPF) being configured to reject an image signal of the RF signal.

20. The mobile device of claim 19, wherein the band-selective image signal rejection chooses a low-side injection of a selected one of the LO signals used for an up/down conversion.

\* \* \* \* \*